(12) United States Patent
Dunn et al.

(10) Patent No.: US 7,685,345 B2
(45) Date of Patent: Mar. 23, 2010

(54) APPARATUS AND METHOD FOR FAIRNESS ARBITRATION FOR A SHARED PIPELINE IN A LARGE SMP COMPUTER SYSTEM

(75) Inventors: Deanna Postles Dunn, Poughkeepsie, NY (US); Christine Comins Jones, Poughkeepsie, NY (US); Arthur J O'Neill, Wappingers Falls, NY (US); Vesselina Kirilova Papazova, Highland, NY (US); Robert J Sonnelltier, III, Wappingers Falls, NY (US); Craig Raymond Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 11/768,934

(22) Filed: Jun. 27, 2007

(65) Prior Publication Data

US 2009/0006693 A1 Jan. 1, 2009

(51) Int. Cl.
*G06F 13/14* (2006.01)
*G06F 13/368* (2006.01)

(52) U.S. Cl. .................. 710/244; 710/119; 710/120

(58) Field of Classification Search ............... 710/119, 710/120, 244
See application file for complete search history.

(56) References Cited

U.S. PATENT DOCUMENTS

| 4,991,085 | A | * | 2/1991 | Pleva et al. | 326/82 |
| 6,119,188 | A | | 9/2000 | Sheafor et al. | |
| 7,007,123 | B2 | * | 2/2006 | Golla et al. | 710/243 |
| 2003/0145144 | A1 | * | 7/2003 | Hofmann et al. | 710/110 |

* cited by examiner

*Primary Examiner*—Mark Rinehart
*Assistant Examiner*—Jeremy S Cerullo
(74) *Attorney, Agent, or Firm*—John E. Campbell; Daniel E. McConnell

(57) ABSTRACT

A modification of rank priority arbitration for access to computer system resources through a shared pipeline that provides more equitable arbitration by allowing a higher ranked request access to the shared resource ahead of a lower ranked requester only one time. If multiple requests are active at the same time, the rank priority will first select the highest priority active request and grant it access to the resource. It will also set a 'blocking latch' to prevent that higher priority request from re-gaining access to the resource until the rest of the outstanding lower priority active requesters have had a chance to access the resource.

20 Claims, 3 Drawing Sheets

1st LEVEL PRIORITY REQUEST

2nd LEVEL PRIORITY REQUEST

RESOURCE GRANT
(SENT TO 2nd LEVEL PRIORITY LOGIC)

2nd LEVEL REQUEST BLOCKING
RANK LATCH

STAGED RESOURCE GRANT
(AVAILABLE AT 1st LEVEL LOGIC)

1st LEVEL REQUEST BLOCKING
RANK LATCH

APPARATUS AND METHOD FOR FAIRNESS ARBITRATION FOR A SHARED PIPELINE IN A LARGE SMP COMPUTER SYSTEM

FIELD AND BACKGROUND OF INVENTION

This invention related to a computer system design and particularly to shared pipeline request fairness algorithms.

Cycle time in high end multiprocessor systems continues to decrease as technology advances. However, the number of requests sharing a resource is increasing because today's systems are including higher numbers of active processors and IO requestors. Additionally, more and more logic is being moved onto a single chip. This combination requires new priority mechanisms that take up less physical space, consume less power, simply design and chip wiring and that minimize the number of critical timing paths, while maintaining a sufficiently robust priority mechanism to handle an increased number of requesters.

Traditionally, the least physically demanding scheme has been basic rank priority. In this scheme, all the requestors waiting to use a resource are assigned a rank order, and are only allowed access to the resource if no higher ranking requests are present. While the basic rank priority scheme is efficient from a physical design point of view (it uses fewer latches and less silicon) than more complicated schemes, logically it is not a very fair algorithm. The lower ranked requesters may be continually and indefinitely blocked by a plurality of higher ranked requesters. The Least Recently Used (LRU) priority scheme is a more 'fair' algorithm, but it requires many latches and increases the number of critical paths and priority latency. One prior art priority scheme is taught in Shaefer et al U.S. Pat. No. 6,119,188, to which the interested reader is referred should more detailed information be desired.

SUMMARY OF THE INVENTION

The shortcomings of the prior art are overcome and additional advantages are provided through the provision of an arbitration scheme that fairly prioritizes requests for use of a shared resource whole minimizing the amount of latches, combinational logic and critical timing paths. This invention is a modification of rank priority that provides more equitable arbitration by allowing a higher ranked request access to the shared resource ahead of a lower ranked requester only one time. If multiple requests are active at the same time, the rank priority will first select the highest priority active request and grant it access to the resource. It will also set a 'blocking latch' to prevent that higher priority request from re-gaining access to the resource until the rest of the outstanding lower priority active requesters have had a chance to access the resource.

In addition, it solves the problem of having to meet cycle time with arbitration among a large number of requesters in one cycle by distributing the prioritizing logic across two cycles while maintaining the integrity of the arbitration.

System and computer program products corresponding to the above-summarized methods are also described and claimed herein.

Additional features and advantages are realized through the techniques of the present invention. Other Embodiments and aspects of the invention are described in detail herein and are considered a part of the claimed invention. For a better understanding of the invention with advantages and features, refer to the description and to the drawings.

BRIEF DESCRIPTION OF DRAWINGS

Some of the purposes of the invention have being stated, others will appear as the description proceeds, when taken in connection with the accompanying drawings, in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
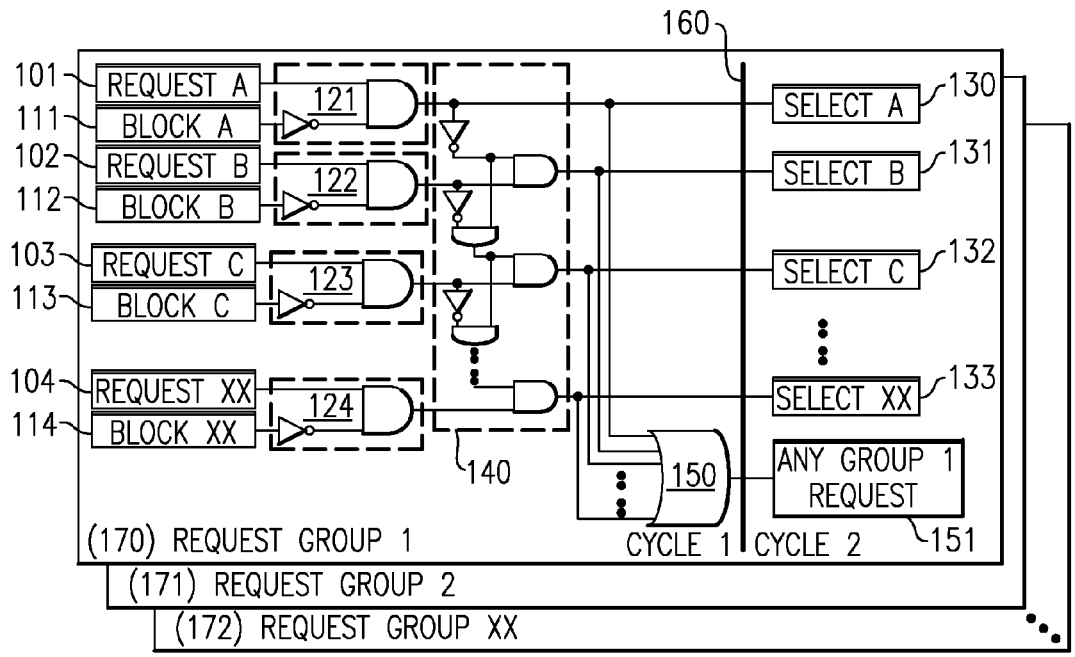
FIG. 1 illustrates the gate-level implementation of the blocking rank scheme's first cycle.
Figure 2:
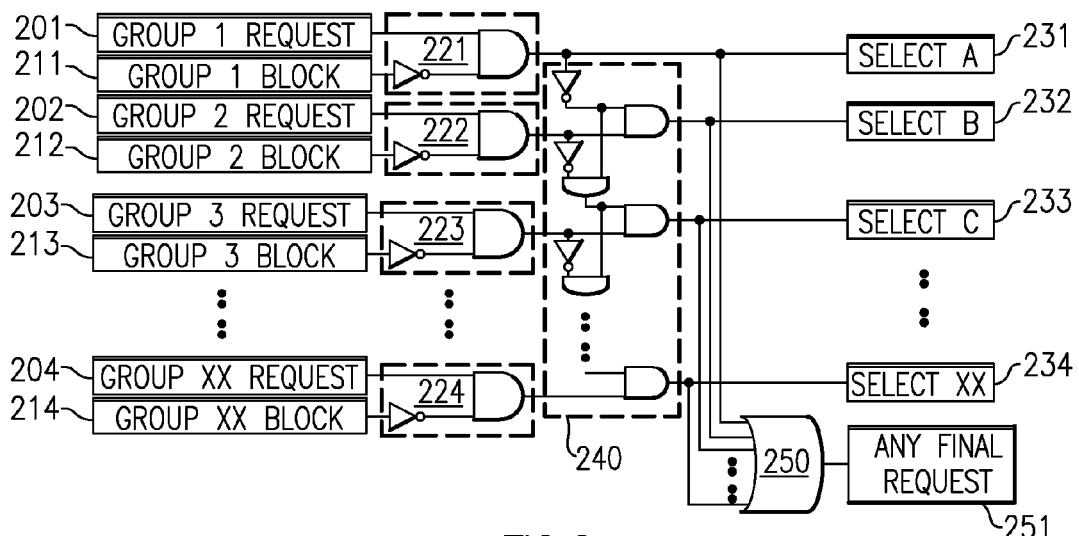
FIG. 2 illustrates the gate-level implementation of the blocking rank scheme's second cycle.

Turning now to the drawings in greater detail, FIG. 1 and FIG. 2 show how a large number of requestors can be divided into a number of groups with a smaller number of requesters within each group. Additionally, these two figures show how the arbitration logic is performed across two logical cycles. FIG. 1 shows the 'first level' portion of the arbitration logic, which takes place in the first logical cycle. FIG. 2 shows the second 'second level' portion of the arbitration which takes place in the second logical cycle.

FIG. 1 shows the first level blocking rank arbitration taking place in parallel for a variable number of requester groups 170, 171, 172 with each group having a variable number of requesters 101, 102, 103, 104. This is the within-group arbitration. All the within-group takes place in parallel to all the other groups' within group arbitration.

There is one blocking rank latch for each requester latch. The blocking latches are all set to '0' initially. In FIG. 1, blocking rank latch Block A 111 is the blocking rank latch for Request A 101. Before being presented to the rest of the arbitration logic 140, the request signal 101 is gated with the block signal 111 as shown by the logic gates in block 121. In this way, the request will not appear active to the remaining arbitration logic 140 if the block latch 111 is active. This gating scheme is repeated for the other requests in the same first level arbitration group. Requests 102, 103, and 104 are grated with blocking rank latches 112, 113, and 114, respectively and provide inputs to the downstream priority logic 140 of 122, 123, 124, respectively. Hence, when all the blocking rank latches are set to '0' the logic behaves like basic rank priority.

When one or more first cycle requests become active, the rank priority will select a request to be presented to the second level of priority. The priority logic also outputs a set of mutually exclusive select lines 131, 132, 133, 134, one select output corresponding to each requester input and a first level request signal which is active if any of the requests gated with the blocking latch are active. As 140 shows, 101 is the highest ranking requester, thus if its block latch 111 is not active, its first level select latch 131 will be set. Request 102 is the second highest ranking requester, thus if its block latch is not active and there is no gated higher ranking request active from 121, the corresponding first level select latch 122 will be set. Similarly, request 103 is the third highest ranking requester, thus if its block latch 113 is not active and there is not gated higher ranking request from 121 or 122, the corresponding first level select latch 123 will be set.

This scheme continues for as many requesters as there are in the group, with the lowest ranked requester 104 only having it's select latch 124 set if no higher number gated requests are active. Due to the 'OR' function that takes place across all the select lines 150, if any of the output lines from the request gating logic 121, 122, 123, or 124 are active, the Group 1 request latch 151 will be set. This latch will be active in the following cycle 160. Each parallel first level priority group's 170, 171, 172 winning request is latched 151 and presented to the second level blocking rank priority logic in the next cycle 150. The select lines are used to multiplex the data accompanying the request and stage this data to the next cycle for presentation to the second level priority mutliplexing.

FIG. 2 shows the second level blocking rank arbitration taking place for a variable number or requesters. At the second level, the winning request from each first level priority station 201, 202, 203, 204 vies for priority to access the shared pipeline 251. Similar to the first level priority arbitration, there is one blocking rank latch for each second level requester, and all the blocking rank latches are set to '0' initially. FIG. 2, blocking rank latch 211 is the block rank latch for request 201. Before presented to the rest of the arbitration logic 240, the request signal 201 is gated with the block signal 211 as shown by the logic gates in block 221. In this way, the request will not appear active to the remaining arbitration 240 if the block latch 211 is active. This gating scheme is repeated for the other second level priority requesters: requests 202, 203 and 204 are gated with blocking rank latches 212, 213 and 214, respectively and provide inputs to the downstream priority logic 240 of 222, 223, 224, respectively.

When one or more gated second cycle requests become active 221, 222, 223 or 224, the rank priority 240 will select a request to be presented to the shared pipeline. The second level priority logic outputs a set of mutually exclusive select lines 231, 232, 233, 234, one select output corresponding to each requester input and a final request signal which is active if any of the second level requests gated with the blocking latch 221, 222, 223 or 224 are active. The arbitration scheme at the second level is identical to that at the first level, although the actual number of requesters may vary.

This scheme continues for as many requesters for as many requesters as there are in the group, with the lowest ranked requester 204 only having it's select latch 224 set if no higher number gated requests 221, 222 or 223 are active. Due to the 'OR' function that takes place across all the select lines 250, if any of the output lines from the request gating logic 221, 222, 223 or 224 are active, the final request latch 251 will be set. The select lines are used to multiplex the data accompanying the request and present this data to the shared pipeline.

Figure 3:
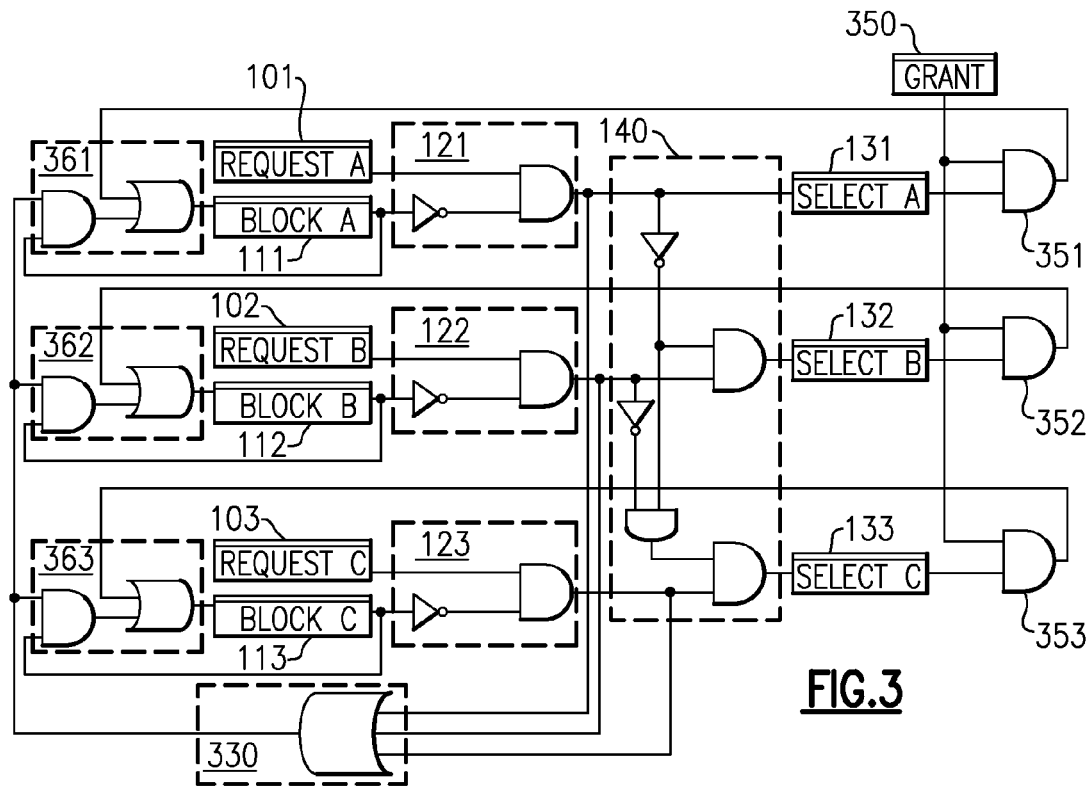
FIG. 3 illustrates an example of the present invention, showing the priority selection method with three independent requestors, focusing specifically on the setting and resetting of the block latches.

FIG. 3 is an example showing the priority selection method for the first level of priority with three independent requesters and the controls for setting and resetting of the blocking latches. The priority selection is done in the same manner as shown in FIG. 1 at 140. If the request is selected by the second level of priority, this is reported back to the first level via a grant signal 350. When the grant signal is asserted indicating the request was accepted by the second level of the priority logic, the selected request is gated with the grant 351, 352, 353 and will then set its block indication 111, 112, 113. If this is the second stage of priority, then there is no external grant signal and the select signals 131, 132, 133 may be used to directly set the block indication 111, 112, 113. After this point, future requests by the selected requester will be blocked from being included in the priority selection 121, 122, 123, thus creating an opportunity for lower ranked requests to be selected by the priority logic. As long as a request exists for the priority logic to select 330, the block indication for previously granted requests must be held 361, 362, 262 to allow lower ranked requests to be selected. When there are no longer any requests available to be selected 121, 122, 123, all requesters had the opportunity to be satisfied, and all blocking 111, 112, 113 may be released.

Figure 4:
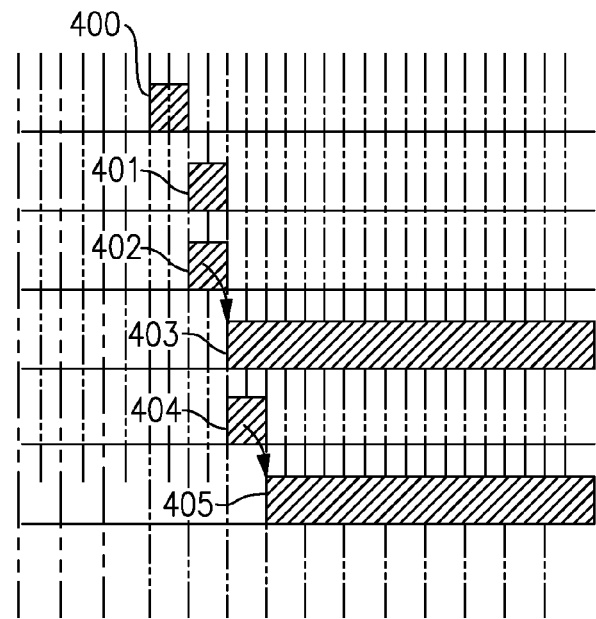
FIG. 4 illustrates the timing of the blocking rank latch settings in relation to a resource grant.

FIG. 4 demonstrates the timing relationship between an initial request to the first level of the arbitration logic 400 and the block indication being set due to successfully gaining access to the shared resource 405. The request to the first level of arbitration is selected 400 and then staged to the second level 401. When the second level of arbitration the selects the request 402, it then causes a blocking indication for the second level 403 to be set, which prevents the same request from being selected multiple times. The results of the second level of arbitration are forwarded to the first level one cycle later 404, and this indication is used to set the first level arbitration block 405.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

Figure 5:
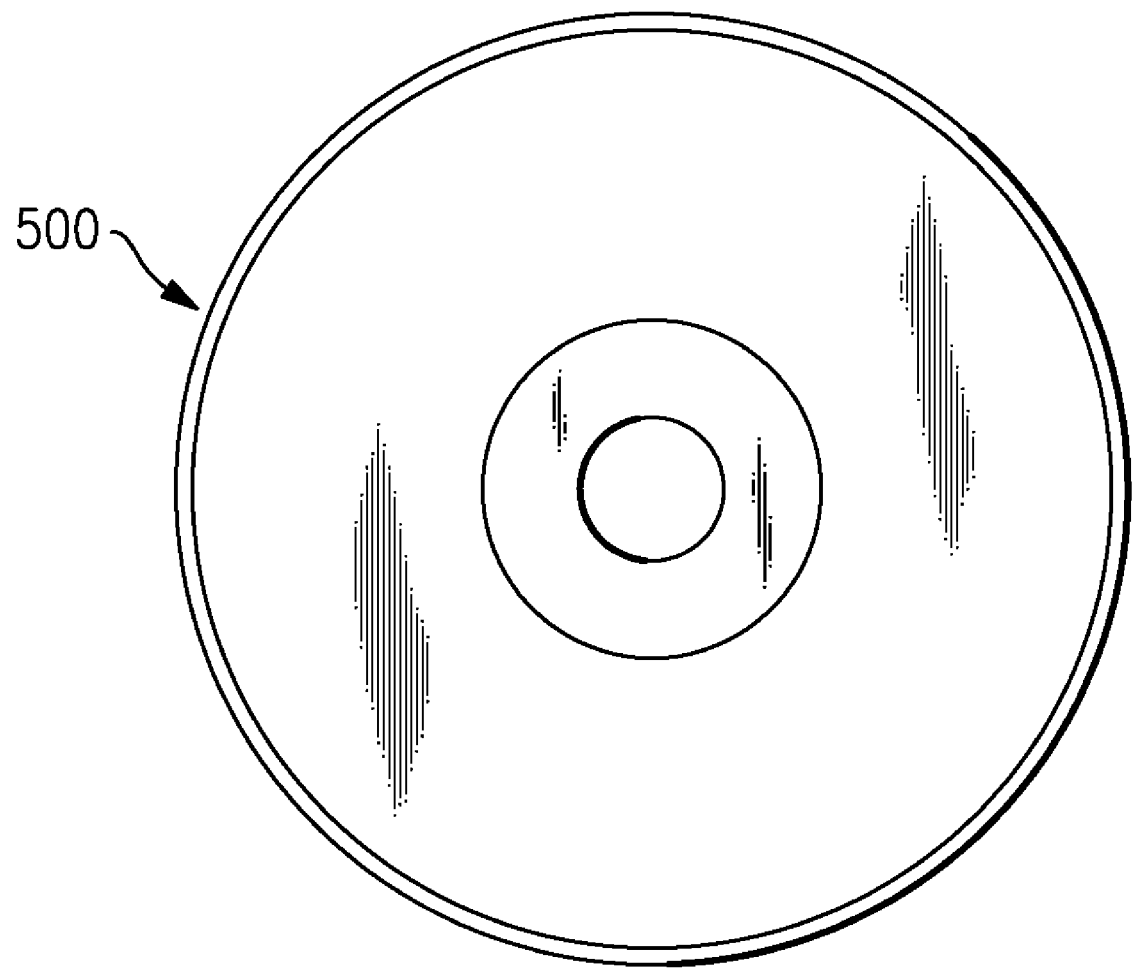
FIG. 5 illustrates a computer readable media bearing program instructions implementing the present invention.

FIG. 5 shows a computer readable medium, in the form of an optical disk 500, which carries computer executable code stored on the media accessibly to and executable on a computer system for implementing this invention. While here shown for purposes of illustration, it will be appreciated that the media may be an optical disk, a magnetic disk, a signal passed to the system, or some other form know to those of skill in the art. What is significant is that the appropriate instructions are produced and then provided to be deployed to and executed on a computer system which has a plurality of priority setting logic elements which controllably pass requests for access to computer system resources to a shared pipeline as contemplated here.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. Although specific terms are used, the description thus given uses terminology in a generic and descriptive sense only and not for purposes of limitation.

What is claimed is:

1. Apparatus comprising;
a plurality of priority setting logic elements which controllably pass requests for access to computer system resources through a shared pipeline, said plurality of logic elements comprising;
a first element which gates a request for resource access to the shared pipeline;
second elements operatively associated with said first element and which receive access requests to be passed through said first element; and
third elements which serve as blocking latches, each of said third elements being operatively associated with a corresponding one of said second elements and effective to permit or block a request passing through said second element reaching said first element; and
said second and third elements cooperating to latch a second element in a blocked condition blocking the passing of an access request to said first element in the event that a request is pending at another of said second elements.

2. Apparatus according to claim 1 wherein said second elements are organized in a ranked priority scheme and further wherein the cooperation of said second and third elements modifies the ranked priority scheme to favor fairness in access for lower ranked second elements.

3. Apparatus according to claim 1 wherein said logic elements are semiconductor gates.

4. Apparatus according to claim 1 wherein said logic elements are program elements executing on a processor.

5. Apparatus according to claim 1 wherein said logic elements are a series of instructions provided by program media.

6. Apparatus according to claim 1 wherein said plurality of logic elements are arranged in a linked layered structure with said layers being organized in a ranked priority scheme, each layer comprising a set of first, second and third elements associated with the other elements grouped in a common layer, and any request for access passing through successive linked layers as arbitration proceeds first among groups and then across groups.

7. Method comprising;
providing a plurality of priority setting logic elements which controllably pass requests for access to computer system resources to a shared pipeline;
receiving access requests to be passed to the shared pipeline at a plurality of first level elements among the plurality of elements;
gating a received request to the shared pipeline through a second level element upon arbitration for such gating;
selectively permitting or blocking a received request passing through a first level element from reaching the second level element by latching a latch element operatively associated with a corresponding one of the first level elements and effective to permit or block a request passing through the first level element reaching the second level element;
the first level and latch elements cooperating to block the passing of an access request to the second level element in the event that a request is pending at another of the first level elements.

8. Method according to claim 7 wherein the first level elements are organized in a ranked priority scheme and further wherein the cooperation of the first level and latch elements modifies the ranked priority scheme to favor fairness in access for lower ranked first level elements.

9. Method according to claim 8 implemented in logic elements which are semiconductor gates.

10. Method according to claim 8 implemented in logic elements which are program elements executing on a processor.

11. Method according to claim 7 wherein the plurality of logic elements are arranged in a linked layered structure with layers organized in a ranked priority scheme, each layer comprising a set of first, second and latch elements associated with the other elements grouped in a common layer, and any request for access passing through successive linked layers as arbitration proceeds first among groups and then across groups.

12. Method according to claim 7 wherein the method steps are performed as part of a service provided.

13. Method according to claim 12 implemented in logic elements which are semiconductor gates.

14. Method according to claim 12 implemented in logic elements which are program elements executing on a processor.

15. Method according to claim 7 wherein the method is embodied in a series of instructions provided by program media.

16. Method comprising;
producing computer executable program code;
providing the program code to be deployed to and executed on a computer system which has a plurality of priority setting logic elements which controllably pass requests for access to computer system resources to a shared pipeline;
the program code comprising instructions which:
receive access requests to be passed to the shared pipeline at a plurality of first level elements among the plurality of elements;
gate a received request to the shared pipeline through a second level element upon arbitration for such gating;
selectively permit or block a received request passing through a first level element from reaching the second level element by latching a latch element operatively associated with a corresponding one of the first level elements and effective to permit or block a request passing through the first level element reaching the second level element;
the first level and latch elements cooperating to block the passing of an access request to the second level element in the event that a request is pending at another of the first level elements.

17. Method according to claim 16 wherein the first level elements are organized in a ranked priority scheme and further wherein the cooperation of the first level and latch elements modifies the ranked priority scheme to favor fairness in access for lower ranked first level elements.

18. Method according to claim 17 implemented in logic elements which are semiconductor gates.

19. Method according to claim 17 implemented in logic elements which are program elements executing on a processor.

20. Method according to claim 16 wherein the plurality of logic elements are arranged in a linked layered structure with layers organized in a ranked priority scheme, each layer comprising a set of first, second and latch elements associated with the other elements grouped in a common layer, and any request for access passing through successive linked layers as arbitration proceeds first among groups and then across groups.

* * * * *

UNITED STATES PATENT AND TRADEMARK OFFICE
CERTIFICATE OF CORRECTION

PATENT NO. : 7,685,345 B2 Page 1 of 1
APPLICATION NO. : 11/768934
DATED : March 23, 2010
INVENTOR(S) : Dunn et al.

It is certified that error appears in the above-identified patent and that said Letters Patent is hereby corrected as shown below:

Cover Page, Inventors item (75),
"Robert J Sonnelltier, III, Wappingers Falls, NY (US)" should read --Robert J. Sonnelitter III, Wappingers Falls, NY (US)--

Signed and Sealed this

Twenty-fifth Day of May, 2010

David J. Kappos
*Director of the United States Patent and Trademark Office*